United States Patent Office 3,462,411
Patented Aug. 19, 1969

3,462,411
DATA ENTRY SYSTEM
Stephen Deskevich, Endicott, and John B. Newman, Vestal, N.Y., assignors to International Business Machines Corporation, Armonk, N.Y., a corporation of New York
Filed Dec. 23, 1966, Ser. No. 604,276
Int. Cl. G11b *13/00*
U.S. Cl. 340—172.5                                   9 Claims

ABSTRACT OF THE DISCLOSURE

Data is keyed into a delay line storage device high order first, and then regenerated directly unless an additional digit is being keyed, whereupon switch means directs the digit previously keyed, into a one digit register and thence into the delay line to follow the additional digit, thus rearranging the order of the digits.

---

This invention relates generally to data entry and it has reference in particular to the use of delay line storage devices for entering data into a processing system.

Generally stated, it is an object of this invention to provide a simple and efficient entry delay line arrangement for controlling the entry of data into a main delay line for a plurality of different field positions.

More specifically, it is an object of the present invention to provide for keying data into an entry delay line, high order first, and automatically rearranging the order of the data after the first digit is entered so that it appears low order first in the delay line.

Another object of the invention is to provide for operating a counter to register the number of a field in which data is stored in a delay line and advancing the counter for each different field in one range of field counts, and for only every other field, outside of said range.

Yet another object of the invention is to provide for utilizing entry means for inhibiting more than a single entry into a recirculating data type of storage device for most keys in an entry keyboard, and for blocking operation of the entry means to permit double digit entry into said storage devices from a particular key.

One of the objects of this invention is to permit the entry of double zeros into a delay line storage device from a single key operation.

Another object of the invention is to provide for controlling the reset of entry bit latches in a control circuit for a delay line storage device, so as to permit repeated entry of a particular digit.

In practicing the present invention according to a preferred embodiment thereof, data which is to be used to update data in a main delay line or the like, is keyed from a keyboard parallel-by-bit, serial-by-digit into entry bit latches from whence it is entered serial-by-bit into an entry delay line which accommodates one field of data at a time. From the entry delay line, the data is regenerated and returned to the entry delay line input, unless another digit being keyed appears at the input, whereupon the digit already entered into the delay line is now directed into a one-digit register while the new digit enters the delay line. After this, the original digit is re-entered into the delay line from the register following the second digit, and both are regenerated and returned to the input unless a third digit should appear at the input, in which case the two entered digits enter the register in turn while the third digit enters the delay line ahead of them while the second digit is in the register. A key is also provided for entering double zeros by inhibiting for a second operating cycle set of a reset latch which normally clears the bit latches at the end of one cycle, and so permit a second entry into the delay line of the digit retained in the bit latches.

The foregoing and other objects, features and advantages of the invention will be apparent from the following more particular description of a preferred embodiment of the invention, as illustrated in the accompanying drawings.

Figure 1:
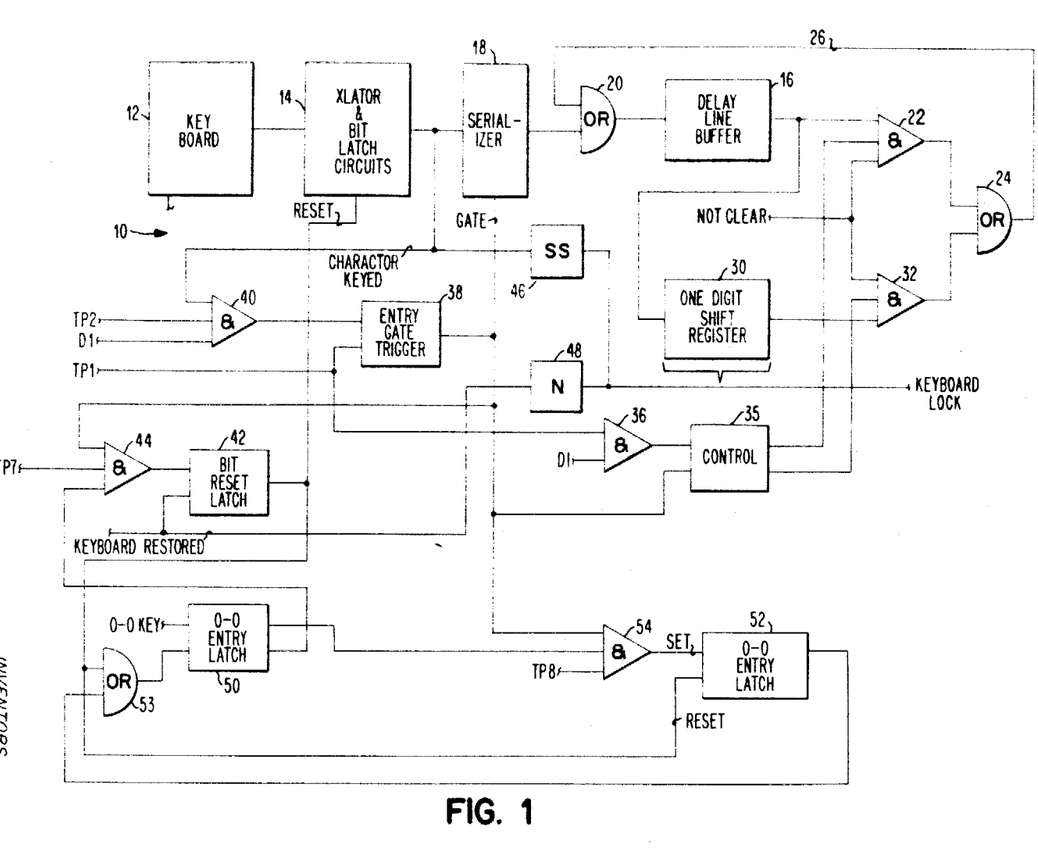
FIGURE 1 is a schematic block diagram of a data entry system embodying the invention in a preferred form.

Referring to FIGURE 1, the reference numeral 10 denotes generally a data entry system in which data to be entered into a system for updating fields in a main delay line are keyed by the operator on a keyboard 12 which enters the data through Translator and Bit Latch circuits 14 into an Entry Delay Line 16 (EDL) through serializer circuits 18 and OR circuit 20. The delay line 16 accommodates a single field of data which is regenerated either through AND circuit 22, OR circuit 24 and line 26 to the input of the delay line through OR circuit 20, or is regenerated through a one-digit shift register 30, AND circuit 32, OR circuit 24, and line 26 back to the input through OR circuit 20.

Control of the regeneration path is effected by a Regeneration Control Latch 35 whose on and off outputs provide inputs to the AND circuits 22 and 32 respectively. Operation of the control latch 35 is effected by setting the control latch through AND circuit 36 by a timing pulse TP1 and digit time D1, and resetting the control latch by an Entry Gate Trigger 38 which is set whenever a character is keyed into the Translator and Bit Latch circuits 14 through AND circuit 40.

The latches in the Translator and Bit latch circuits 14 are reset by a Bit Reset Latch 42 which is set through AND circuit 44 at time TP7 and is reset upon the termination of a character keyed by a signal from single shot 46 through inverter 48.

In order to permit the entry of double zeros from a double zero key in the keyboard 12, Double Zero Entry Latches 50 and 52 are provided for delaying the set of the Bit Reset Latch 42 until a succeeding cycle. This is accomplished by utilizing the OFF output of the latch 50 through AND circuit 44 to inhibit set of Bit Reset Latch 42, and effecting reset of the latch 50 to produce this OFF output through OR circuit 106 by the ON output of the latch 52 which is set at a later time through AND circuit 54.

Figure 2:
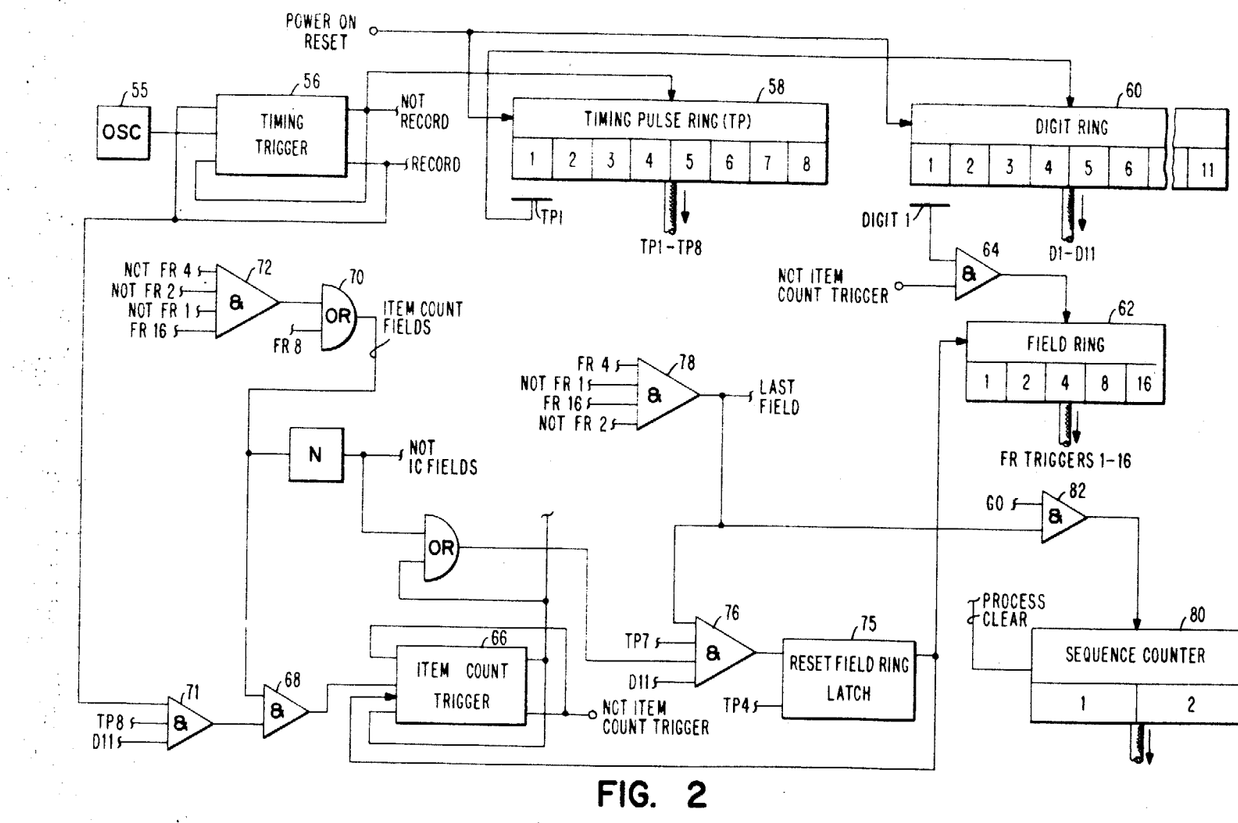
FIGURE 2 is a schematic timing circuit diagram showing the relations of a timing pulse ring, a digit ring, a field ring and a sequence counter.

Referring to FIGURE 2, it will be seen that an oscillator 55 is utilized to provide timing pulses for operating a timing trigger 56 whose ON output is designated NOT Record and whose OFF ouput is designated Record. The NOT Record output is utilized to advance an eight-position free running Timing Pulse Ring 58 for producing timing pulses TP1 through TP8. The leading edge of Timing Pulse TP1 is used to advance an eleven-position Digit Ring which counts the digits in each field producing digit signals D1 through D11. The digit signal D1 is used to advance a five-stage binary counter Field Ring 62, through AND circuit 64.

The Field Ring is advanced a count of one for each D1 signal for fields zero through seven. Since fields 8 through 16 include an item count field with each field, ring 62 is advanced a count of one for every other D1 signal for the fields 8 through 16, and then returns to the advance for each D1 signal for fields 17 through 20. This is accomplished by using as one of the inputs to AND 64 a NOT Item Count Signal which is obtained from the OFF output of an Item Count Trigger 66. This trigger is gated by the output of an AND circuit 68 one of whose inputs is the output of an OR circuit 70 and the other the output of AND circuit 71.

The OR circuit 70 has as one of its inputs the output of Field Ring Trigger 8 and as its other input the output of an AND circuit 72. The inputs to the AND circuit 72 are, NOT FR4, NOT FR2, NOT FR1 and FR16.

The Item Count Trigger 66 is reset by a Reset Field Ring Latch 75 which operates also to reset the Field Ring 62. The latch 75 is set by the output of an AND circuit 78, one of whose inputs is a Last Field signal from an AND circuit 78, whose inputs are FR4, NOT FR1, FR16 and NOT FR2, the last field being field 20 in this case.

A two-stage binary counter 80 is provided for operating as a Sequence Counter, sequence 1 being an add sequence and sequence 2 being a print sequence. AND circuit 82 having as inputs the Last Field signal from AND circuit 68, and a Go signal from an operator activated motor bar or key operates to advance the sequence counter. Reset of the Sequence Counter is effected by a Process Clear signal generated at the end of the last field in Sequence 3, indicating end of the operation.

Figure 3A:
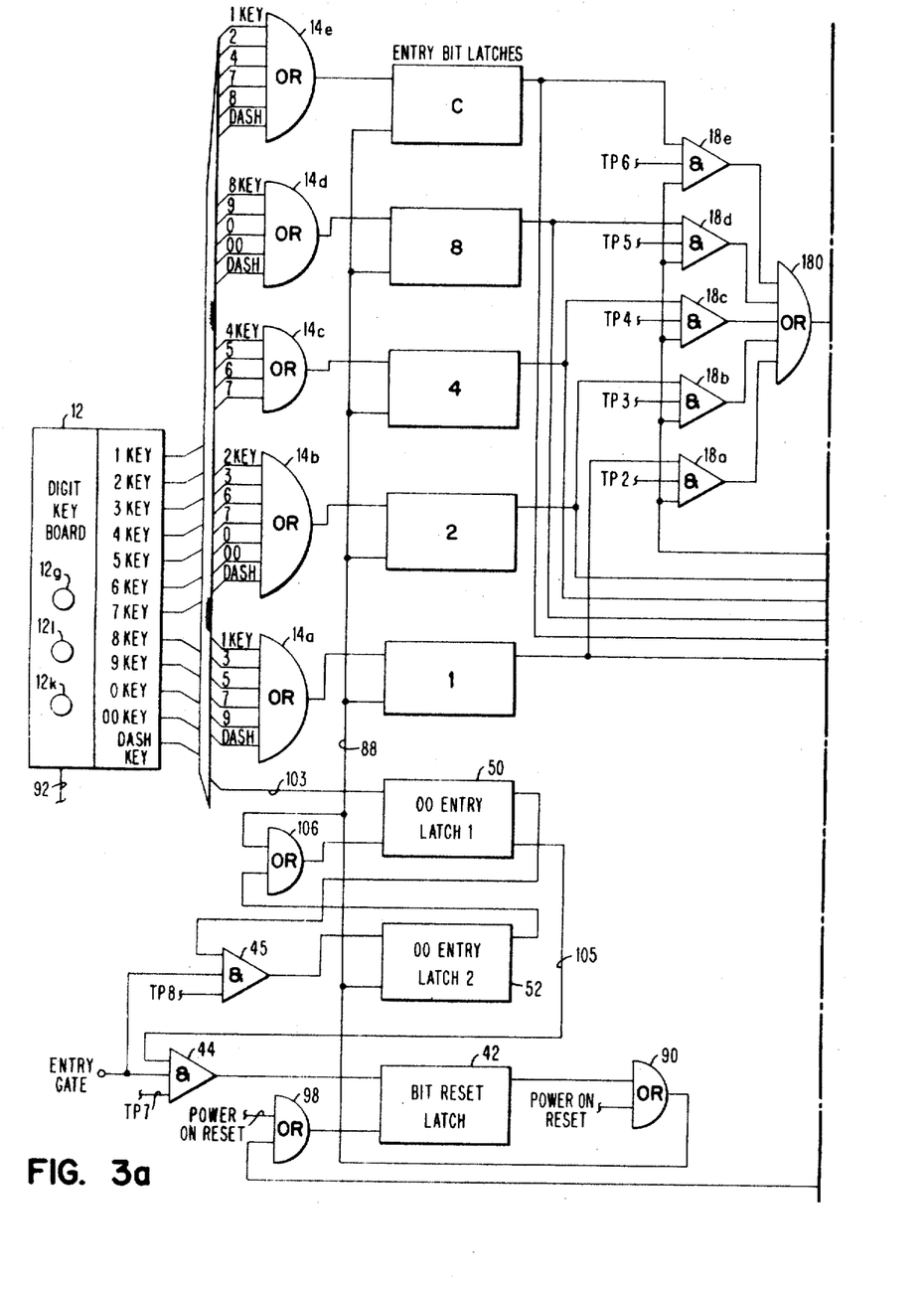
FIGURES 3a and 3b taken together are a schematic diagram of the data entry system of FIGURE 1 in such detail as would be used with the circuits of FIGURE 2.
Figure 3B:
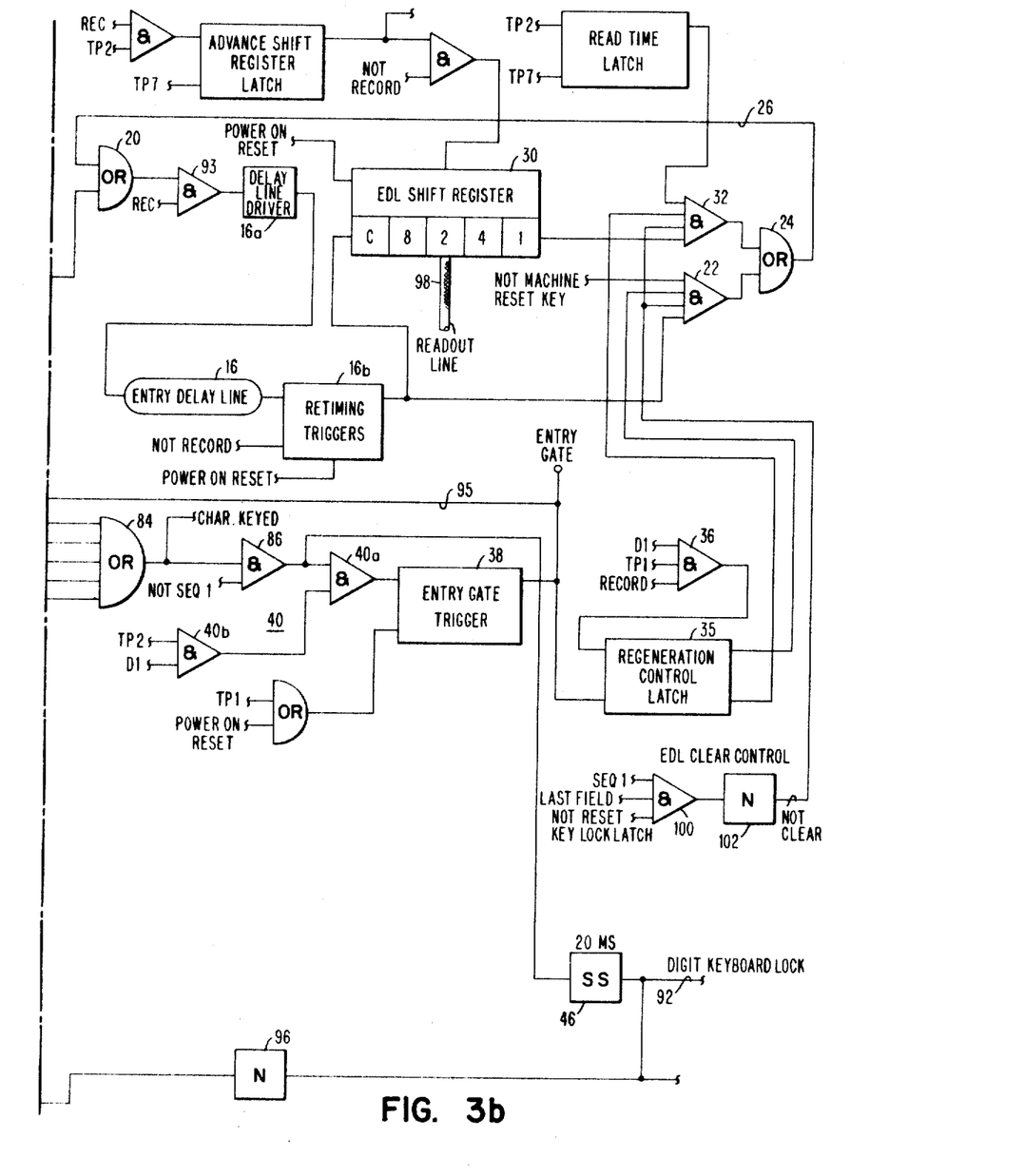

Referring to FIGURES 3a and 3b, it will be seen that the keyboard 12 may be provided with a plurality a digit keys of which the single key 12k shown is representative and is the Double Zero key in the present instance. The several keys are provided with contacts which provide connections through the several Translator OR circuits 14a through 14e to the 1, 2, 4, 8 and C Entry Bit Latches. The Entry Bit Latches are connected through an OR circuit 84 to provide a Character Keyed Signal which is utilized through AND circuit 86 and AND circuit 40a to set the Entry Gate Trigger 38, the output of which resets the Regeneration Control Latch 35 to provide for regeneration of data in the Entry Delay line 16 through the single character Shift Register 30 whenever there is a bit in one of the latches 1, 2, 4, 8 or C. The delay line 16 is provided with a Delay Line Driver 16a of any suitable type and also with retiming triggers 16b which serve to compensate for variation in the transit time through the delay line and assist in synchronization. The Regeneration Control Latch 35 is turned ON through AND circuit 36 in response to coincidence of the D1 and TP1 timing signals together with the Record signal, and activates AND circuit 22 for regenerating data in the delay line directly back to the input thereof over line 26 through OR circuit 20, when there is no bit in any of the Entry Bit Latches. The Entry Bit Latches 1, 2, 4, 8 and C are connected to the OR circuit 20 through the serializer circuit 18 which comprises a plurality of AND circiuts 18a through 18e connected to an OR circuit 18o. Serialization is effected by connecting the AND circuits 18a through 18e to different outputs of the Timing Pulse Ring 58, connections being made for example to TP2, TP3, TP4, TP5 and TP6 respectively. Reset of the bit latches 1, 2, 4, 8 and C is effected over line 88 from Bit Reset Latch 42 through OR circuit 90, the Bit Reset Latch being turned on through AND circuit 44. When the latch 50 is set by operation of the Double Zero key 12k, double zero Entry Latches 1 and 2 designated by the numerals 50 and 52, respectively, delay the operation of the Bit Reset Latch 42 until a succeding cycle of the Timing Pulse Ring 58.

When a key in the keyboard 12, for example, the 9 key 12i, is depressed the 1 and 8 bit latches are set. Output is provided to the OR circuit 84 to provide a Character Keyed signal which is applied through AND circuits 86 and 40a to set the Entry Gate Trigger 38 at digit D1 and timing pulse TP2 time which provides an output from AND circuit 40b. The output of the AND circuit 86 also activates the signal shot 46 to provide a Keyboard Lock Signal over line 92 for operating a suitable lock (not shown) on the keyboard 12 to prevent the operation of further keys until the data keyed is entered. Digits are always entered during D1 time, this being obtained through the inputs to the AND circuit 40b.

Figure 4:
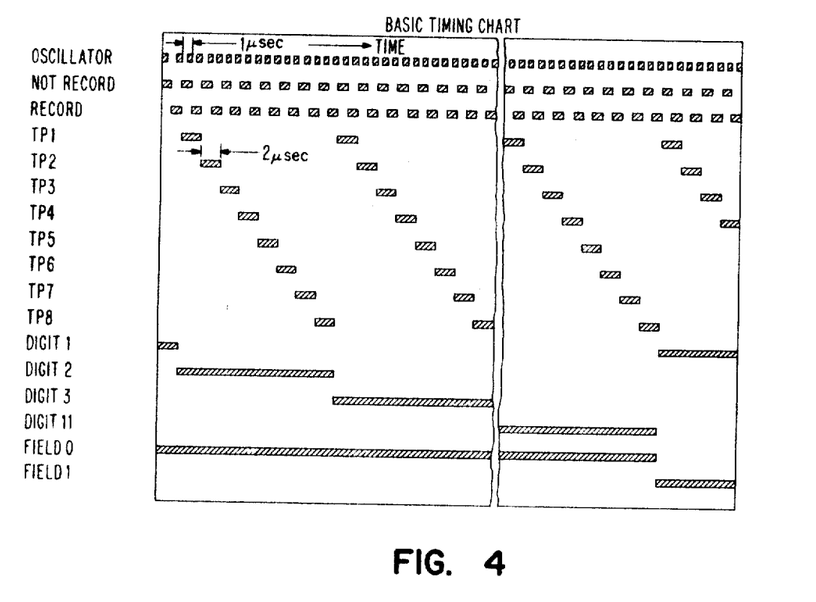
FIGURES 4 through 8 are timing charts showing the relationship of the timing pulses and digit times used with the field and sequence rings controlling the entry of data into the entry delay line in the system of FIGURES 2, 3a and 3b.
Figure 5:
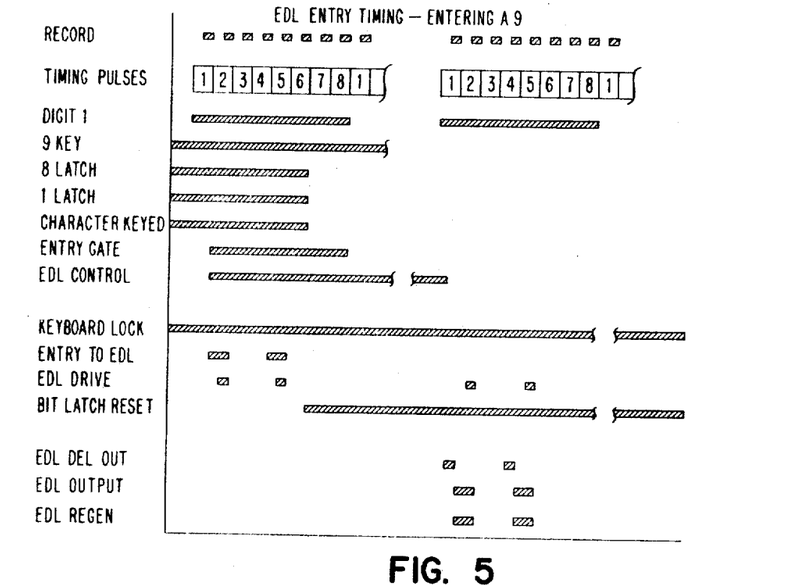

As shown in FIGURE 4 the 1 and 8 bits of the digit 9 are entered into the delay line from AND circuits 18a and 18d at TP2 and TP5 respectively. Since the Regeneration Control Latch 36 was set at TP1 and reset at TP2 by the Entry Gate Trigger signal, blanks will regenerate through the Shift Register 30, AND 32, OR 24, line 26 and OR 20 for the first revolution. The 1 and 8 Bit Latches are reset at TP7 through AND 44 Bit Reset Latch 42 and OR 90 so that the Character Keyed signal is removed, and the Entry Gate Trigger 38 resets at TP1 of the next revolution, whereupon Regeneration Control Latch 35 is set at TP1 and regeneration returns to the path through AND 22, so that the 1 and 8 bits normally regenerate from the end of the delay line 16 through AND 22.

Figure 6:
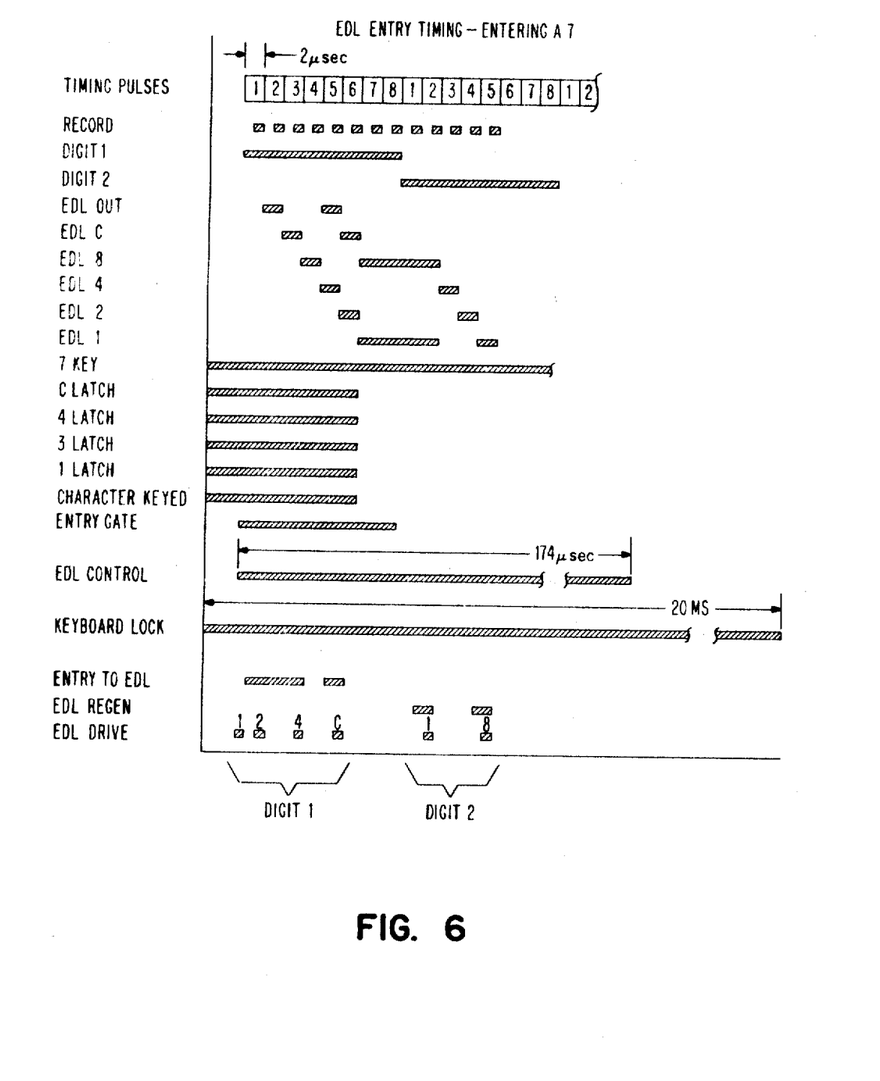
Figure 7:
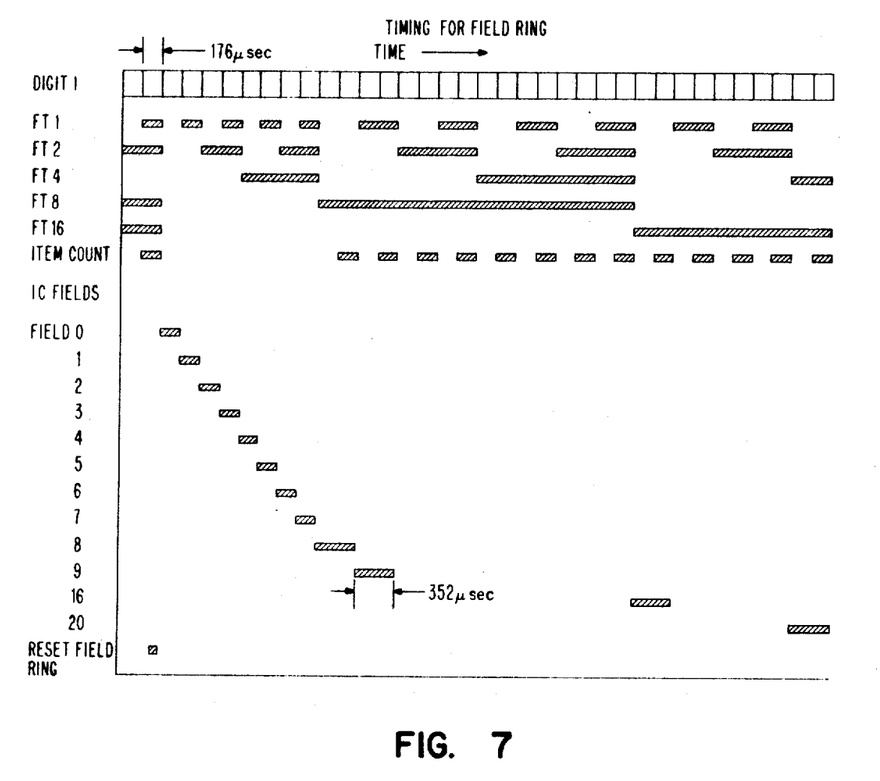
Figure 8:
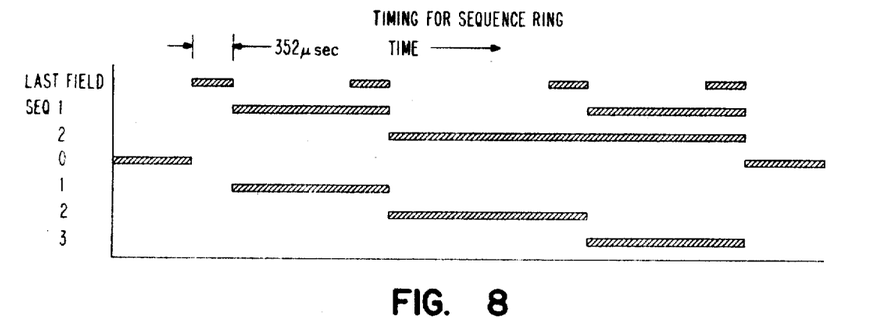

Should the 7 key 12g be depressed, the 1, 2 4 and C bit latches will be set. A character Keyed signal is provided to the Entry Gate Trigger 38 to set it and produce the ON Entry Gate signal. This resets the Regeneraation Control Latch and activates AND 32, deactivates AND 22. The originally entered 9 is entered into the Shift Register 30 and at the same time the newly keyed 7 is entered in the line from AND circuits 18a, 18b, 18c and 18e serially during the digit time D1 in response to particular ones of the timing pulses TP2 through TP6. Since the shift register is one digit long, the 9 digit is delayed or shifted one digit time in the delay line while the new digit (7) was being entered. The timing relations are shown in FIGURE 6 for this operation.

At TP7 time of D1 digital time, after the digit 7 has been entered into the Entry Delay Line, the Bit Reset Latch 42 is set by the output of AND circuit 44 and the ouput of the latch 42 through OR circuit 90 resets the bit latches 1, 2, 4 and C over conductor 88. Information now regenerates from the end of the shift register 30 until TP1 of the next D1 digit time. This is equivalent to one full revolution of the delay line and the newly entered digit 7 is now at the end of the delay line. At this time, the Regeneration Control Latch 35 is set by the output from the circuit 36 and the data regeneration is switched from the end of the shift register 30 back to the end of the energy delay line 16.

When the single shot 46 times out (20 ms.) the keyboard lock signal is removed and the Bit Reset Latch 42 is reset through inverter 96 and OR circuit 98. The system is now returned to a normal setting state and a new digit could be entered. The same process would be repeated for each digit, thus causing any previously entered data to be regenerated around in front of any entered digit. Thus the last digit keyed is the first digit to appear at the end of an Entry Delay Line and data which is keyed in high order first by the operator appears in the Entry Delay Line low order first so as to be available for processing.

The shift register 30 also presents the keyed data in a parallel-by-bit form which is necessary for arithmetic processing, this output being obtained over the output line 98. The Entry Delay Line can be cleared by inhibit regeneration of the data. For example, as the operator senses a mistake has been made in keying, a Machine Reset key may be activated which removes the NOT Reset signal from AND circuit 100 and inverter 102 which removes the NOT Clear signal from AND circuit 22 and 32 to inhibit regeneration of data in the delay line.

The Double Zero key 12k entry is controlled by the Double Zero Entry Latches 50 and 52. Depression of the key 12k sets the same entry bit latches 2 and 8 as does the zero key. The Double Zero key also sets the Entry Latch 50 over the line 103. Character entry and operation of the Entry Gate Trigger 38 occur in the usual manner allowing the first zero to be entered into the delay line 16. However, the fact that Entry Latch 50 is set, inhibits set of the Bit Reset Latch 42, since the OFF output of the Entry Latch 50 over the line 105 is removed from the AND circuit 44. At TP8 Entry Latch 52 is set through AND circuit 45. The Entry Gate Latch 38 still being ON, and the output of latch 52 resets the Entry Latch 50 through OR circuit 106. The Entry Gate Trigger is reset at the normal time TP1 of the next digit. However, the Character Keyed signal stays ON because the bit latches 2 and 8 were not reset. As a result when the Entry Delay Line completes a full revolution and returns to TP2 of digit time D1, the Entry Gate Trigger 38 is again set and another zero is entered in the delay line 16 from the bit latches 2 and 8. Because the Double Zero Entry Latch 50 has been reset, the Bit Reset Latch 42 is actuated at TP7 through AND circuit 44 with the Entry Gate signal. This resets the Entry Latch 52 as well as the bit latches, thus completing the double zero entry.

As described hereinbefore, the sequence of events performed by the operator and the hereinbefore described circuitry is:

(1) The operator keys the amount of a check high order first (left to right).

(2) The keyboard is a ten digit (0 through 9) serial keyboard with the addition of double zero and—keys.

(3) As each digit is keyed, it is translated into BCD and stored in a bank of latches.

(4) Activation of the latches generates a character-on-line signal which actuates an interlock on the keyboard and initiates the entry of the digit into the buffer.

(5) The buffer is a magnetostrictive or sonic delay line with capacity to store ten digits of amount, and has a one digit transistor shift register for:

(a) re-arrangement of the entered data; and (b) conversion of the information from serial-by-bit to parallel-by-bit for processing is attached to the output end of the delay line.

(6) Since a delay line is a volatile means of storage, a free running closed ring is provided to keep track of the data positions in the buffer. This ring is used to synchronize the entry of the digits from the keyboard into the buffer.

(7) Normally, a regeneration of the data in the buffer occurs from the end of the delay line.

(8) A coincidence of a character-on-line signal and the "digit one" position of the free running ring opens logic gates to allow entry of the digit from the latches of the delay line.

(9) Regeneration of any data previously entered is switched through control of logic circuitry from the end of the delay line through the one digit shift register.

(10) This effectively creates a one-digit delay while the new digit is being entered.

(11) The information is regenerated for one revolution of the delay line from the end of the shift register.

(12) Then regeneration is switched back to the output of the delay line.

(13) The bit latches are reset and the keyboard interlock removed allowing a new digit to be keyed.

(14) This process is repeated for every digit. It effectively brings any data previously entered around in front of a new digit keyed such that the last digit keyed of any amount is first in position in the buffer. As a result, the information has been rearranged from high order first as keyed by the operator, to low order first which is required for processing.

Two additional features of the data entry circuitry are:

(1) For a single depression of the double-zero key, the circuitry enters two zeros in the buffer, as for the cents positions, and (2) Means is provided to detect and indicate if the operator keyed more than 10 digits, which exceeds the capacity of the buffer.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The combination with a dynamic or circulating type delay line storage device having an input with a driver and an output of, circuit means connected to apply signals to the input driver, regeneration circuit means connected to the input driver, a register connected to the output of the delay line storage device, switch means operable to selectively connect said regeneration circuit means to said output or said register, and other circuit means comprising a regeneration control latch connected to be set each cycle by a timing signal from a Digit Timing Ring to effect operation of the switch means to connect the regeneration circuit means to said delay line storage device output and reset by a signal from the first-mentioned circuit means.

2. The invention as defined in claim 1 characterized by the circuit means connected to apply input signals to the input driver comprises a multi-key keyboard connected to selectively effect operation of a plurality of Bit Latches in a binary coded arrangement.

3. The invention as defined in claim 2 characterized by the plurality of latches being connected to the input driver through a serializer comprising an AND circuit for each latch having one input connected to the associated latch and another input connected to a succeeding stage of a Bit Timing Ring for serially gating the several bits to the input driver.

4. The invention as defined in claim 2 characterized by the Bit Latches and the Digit Timing Ring being connected to operate an Entry Gate Trigger at a predetermined digit time to provide a signal to control the Regeneration Control Latch.

5. The invention as defined in claim 3 characterized by the Entry Bit Latches being connected to an OR circuit for producing a gating signal for a plurality of AND circuits having inputs from a respective one of the Bit Latches and a different one of a plurality of serially related timing signals.

6. The invention as defined in claim 4 characterized by a Bit Reset Latch for normally resetting the plurality of Entry Bit Latches a predetermined time after one of the latches is set.

7. The invention as defined in claim 6 characterized by one key of the keyboard being connected to enter a particular digit twice by inhibiting reset of the Bit Reset Latch until after a second cycle of the bit ring occurs.

8. The invention defined in claim 7 characterized by a single shot connected to produce a timed pulse in response to a Character Entry Signal from any one of the Entry Bit Latches for operating the Bit Reset Latch to produce a signal to reset the Entry Bit Latches, and a pair of latches connected in cascade with the second one of the pair gated by an earlier timing pulse than the first to inhibit producing a Bit Latch Reset signal until a following timing cycle so that the digit stored in the Entry Bit Latches is entered into the delay line in each of two successive timing cycles.

9. The invention defined in claim 8 characterized by the Bit Timing Ring being connected to advance a Digit Timing Ring used to control entry of data into the delay line for different fields, and a Field Count Ring for keeping count of the different fields connected to the Digit Ring by an AND circuit responsive to the field count and the condition of an Item Count Trigger responsive to Field Ring counts corresponding to fields in a predetermined range having item counts for being advanced by the Digit Ring one count for each digit ring cycle for fields below a predetermined count and for every other cycle, for field counts above said predetermined count.

References Cited

UNITED STATES PATENTS

| | | | |
|---|---|---|---|
| 2,961,535 | 11/1960 | Lanning | 328—55 |
| 2,978,680 | 4/1961 | Schulte | 340—172.5 |

OTHER REFERENCES

IBM Technical Disclosure Bulletin, vol. 5, No. 7, December 1962, pp. 54–55, E. V. Weber and J. E. Damman.

RAULFE B. ZACHE, Primary Examiner